(12) United States Patent
Herberger et al.

(10) Patent No.: US 7,716,015 B2
(45) Date of Patent: May 11, 2010

(54) SINGLE-TRACK LOAD METER FOR AUDIO APPLICATIONS

(75) Inventors: Tilman Herberger, Dresden (DE); Titus Tost, Dresden (DE)

(73) Assignee: Magix AG (DE)

( * ) Notice: Subject to any disclaimer, the term of this patent is extended or adjusted under 35 U.S.C. 154(b) by 108 days.

(21) Appl. No.: 11/828,874

(22) Filed: Jul. 26, 2007

(65) Prior Publication Data
US 2008/0027682 A1    Jan. 31, 2008

Related U.S. Application Data

(60) Provisional application No. 60/833,395, filed on Jul. 26, 2006.

(51) Int. Cl.
*G06F 11/30* (2006.01)
(52) U.S. Cl. ...................................... 702/185
(58) Field of Classification Search ................ 702/185, 702/186; 386/100; 370/252; 718/100
See application file for complete search history.

(56) References Cited

U.S. PATENT DOCUMENTS

| | | | |
|---|---|---|---|
| 4,638,427 A | | 1/1987 | Martin |
| 4,672,471 A | * | 6/1987 | Gouda ......................... 386/100 |
| 5,784,616 A | | 7/1998 | Horvitz |
| 5,995,997 A | | 11/1999 | Horvitz |
| 6,009,452 A | | 12/1999 | Horvitz |
| 6,049,798 A | | 4/2000 | Bishop et al. |
| 6,092,095 A | | 7/2000 | Maytal |
| 6,609,083 B2 | * | 8/2003 | Enck et al. ................... 702/186 |
| 6,795,797 B2 | | 9/2004 | Lee et al. |
| 6,816,809 B2 | | 11/2004 | Circenis |
| 7,031,594 B2 | | 4/2006 | Morishima et al. |
| 2003/0115244 A1 | | 6/2003 | Molloy et al. |
| 2004/0019456 A1 | | 1/2004 | Circenis |
| 2004/0249601 A1 | | 12/2004 | Circenis |
| 2005/0021619 A1 | | 1/2005 | Gomes de Oliveira |

(Continued)

FOREIGN PATENT DOCUMENTS

JP         10208258 A   *   8/1998

(Continued)

OTHER PUBLICATIONS

Deck 3.5—multitrack audio recording, editing, processing and mixing, , Published in: US, May 16, 2006.*

(Continued)

*Primary Examiner*—Tung S Lau
*Assistant Examiner*—Xiuquin Sun
(74) *Attorney, Agent, or Firm*—Fellers, Snider, Blankenship, Bailey & Tippens, P.C.; Terry L. Watt (57) ABSTRACT

There is provided herein a system and method for implementing a track-specific CPU load meter or a similar track-specific indication of CPU performance in a multi-track multimedia-editing environment. The instant invention is preferably presented to the user in the form of a real time meter for use in multi-track multimedia editing applications, wherein the CPU usage associated with sounding/playing each track will be separately displayed in near or actual real time as the musical work is performed. The system allows the user to instantly determine the CPU load for each particular track of the multi-track environment of the underlying application and therefore allows the user to more quickly identify potential problems in the multi-track arrangement and playback of the multimedia work.

4 Claims, 5 Drawing Sheets

U.S. PATENT DOCUMENTS

| | | | |
|---|---|---|---|
| 2005/0071688 A1 | 3/2005 | Hepner et al. | |
| 2005/0120104 A1 | 6/2005 | Boon et al. | |
| 2005/0166204 A1 | 7/2005 | Takatsu et al. | |
| 2005/0235285 A1* | 10/2005 | Monasterio | 718/100 |
| 2006/0026179 A1 | 2/2006 | Brown et al. | |
| 2007/0041330 A1* | 2/2007 | Bostica et al. | 370/252 |

OTHER PUBLICATIONS

Field Test: Apple Logic Pro Workstation, Jan. 1, 2005, Published in: US.*

Massiva Revision History, May 16, 2006, Published in: US.*

Namba, Atsunori and Nigrin, Dan, VSTiHost User Manual Version 3.0, May 16, 2006, Published in: US.*

* cited by examiner

SINGLE-TRACK LOAD METER FOR AUDIO APPLICATIONS

RELATED CASE

This application claims the benefit of U.S. Provisional Patent Application Ser. No. 60/833,395 filed on Jul. 26, 2007, and incorporates said provisional application by reference into this disclosure as if fully set out at this point.

FIELD OF THE INVENTION

The present invention relates generally to the fields of multimedia data creation and performance, and to the creation and playback of digital music.

BACKGROUND OF THE INVENTION

The increasing availability of hardware to create multimedia works has generated a corresponding increase in the desire of consumers to view the resulting works and share those works with friends. Especially in the case of novice users, this has meant a foray into new areas of technology with corresponding exposure to the sometimes difficult process of creating multimedia works such as, for example, computerized music or video works.

The increasing availability of multimedia digital editing software and hardware has brought new users into this field. These multimedia works are usually created in digital editing applications that have been specifically designed for that purpose and which have established a more-or-less standard approach to the editing of digital source materials. The editing process, whether it is applied to audio or video materials, usually requires the use of high-performance computer hardware. However most users eventually discover that, no matter how powerful their hardware might be, they will eventually overtax the capabilities of their system.

One familiar symptom of system overload is the appearance of "lags" in the audio portion of the work. By "lag" is meant the stutters, skips, dropouts, slowdowns etc. (collectively "performance anomaly", hereinafter), that are observed during audio/video playback when the demands on the CPU exceed its ability to respond. For a typical PC user this is an obvious annoyance that may be difficult to eliminate. That is, it is often difficult for a novice user to figure out exactly where the source of the problem lies. However in a professional environment, such as a recording studio or in music or film production environments where the work must be accomplished according to fixed deadlines, a problem such as this can be disastrous for the whole production process.

Of course, lags are almost inevitable in the production of a multimedia work of any complexity. The most common approach to helping the user solve this problem is to provide a system-wide CPU load meter, wherein the current CPU load for the entire computer and/or the current song is displayed in real time. This sort of display informs the user about the general instantaneous CPU load of the entire application. However, it should be clear that this sort of display is not particularly informative when the goal is to determine which of a multiplicity of tracks might be the root cause of the CPU overload.

That is, in some cases, the performance lag is caused by a single track (or by a few tracks). Of course, if it were known which were the problem, eliminating or modifying these track (s) would likely eliminate the lag. However, in today's digital multitrack environment it may be difficult to pinpoint the offending track or tracks if the only information available to the user is that the playback lags at a certain point in time. PC-based digital mixers with twenty-four (or more) tracks are readily available, which makes the task of identifying the lag source problematic and that is especially so, if the only information that is available to a user is the time-location of an anomaly. Further, whether the slow-down is caused by difficulties in sounding or reproducing a single track—or a combination of tracks—is usually not apparent.

A typical approach to solving this problem would be to selectively mute or stop various of the tracks (first one at a time, two at a time, etc.) and note when the problem is eliminated. However such a process is quite tedious and often requires considerable time to come to an acceptable result. Of course, and for those users who are working in the professional sector of audio and video industry, such a process of the time spent in finding and solving such lags ultimately costs the user money, and this is especially so when he or she is not able to finish a product within an allotted deadline.

Thus, what is needed is a system and method that would allow a user to quickly determine which tracks are responsible for causing specific time anomalies in a multitrack work. The method would allow the user to identify specific load connected problems of the corresponding application and therewith would increase the efficiency and work flow of the user.

Accordingly, it should now be recognized, as was recognized by the present inventors, that there exists, and has existed for some time, a very real need for a system and a method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of the invention within the ambit of the appended claims.

SUMMARY OF THE INVENTION

There is provided herein a system and method for implementing a track-specific CPU meter or a similar indication of CPU performance in a multi-track multimedia-editing environment. The preferred method improves the work efficiency of an editor or creator of digital multimedia material and it additionally features a more cost-effective approach for the user working in a professional working environment than prior art approaches. The system and method described herein would be most useful in the context of multimedia editing and is generally directed to the editing and creation of digital multimedia material in a multi-track environment. The system allows the user to quickly determine the CPU load for each particular track of the multi-track environment of the underlying application and therefore allows the user to more quickly identify potential problems in the multi-track arrangement of the multimedia work.

In brief, the instant invention makes it possible for a user to detect potential causes of lags and other performance anomalies in real time when working with multimedia. In a preferred embodiment, the instant invention associates a graphical indicator with each individual track. Typically, the method would be implemented as an integral part of an editing application, but it is also possible for it to be implemented in the form of a plugin for use with—any number of other applications which would similarly benefit from such functionality.

According to one preferred embodiment the instant invention will initialize and operate in conjunction with a multimedia or audio editing program, wherein the user generally selects and arranges music or video clips to create a multimedia work according to his or her desires. As a next preferred step, the user (or the associated computer program) will activate the CPU load meter plugin or similar application. The plugin will need to be compatible at some level with the underlying program to enable the features of the instant invention to operate properly. For example, the compatibility with the underlying program could be established and updated via a periodic update procedure that might include, for example, communications via the Internet between the end-user and the instant inventors whereby updates are transferred.

In a next preferred step, the instant invention will gather information about the work environment of the underlying host-program assuming, of course, that the instant invention is operating as a plugin. As examples of the sorts of information that might be useful, in some preferred embodiments, information such as the type of program, the type of operating system, and the number of available tracks in the multi-track arrangement of the host program could be acquired. As a next preferred step, the instant invention will preferably add one or more custom designed GUI (Graphical User Interface) elements to the GUI of the host-program, wherein these GUI elements will be the visual containers for the specific CPU load information that the instant invention will display to the user.

As a next preferred step, the instant invention will determine whether the host program offers access to information about the CPU load of the individual tracks of the host program. If the host program provides such data, as the next preferred step the method will access the information so-provided and will communicate this information in real time to the GUI elements previously added to the GUI of the host program. This process is preferably carried out in real time and without any intervention needed by the user.

If the program does not provide internal information about the CPU load for each track, the instant invention will preferably connect to the API (Application Programming Interface) of the operating system and retrieve and determine the individual CPU load values therefrom. As a next preferred step, the instant invention will dynamically populate each GUI element with the appropriate CPU load values.

Generally speaking, the instant invention will preferably operate as a real time meter for use in multi-track audio and video application, wherein the CPU usage associated with sounding and activating each track is separately displayed in near or actual real time as the multimedia work is performed. Preferably, a user will be able to determine at a glance which track—or combination of tracks—are claiming the most system resources during play back and editing. Such information would make the process of fine-tuning the performance characteristics of the multimedia work a much easier task.

It should be clear that an approach such as this would be a tremendous aid to the user when creating audio or video works in a professional or amateur multi-track working environment. The instant invention provides the user with individual graphical indicators associated with particular tracks of the multi-track environment informing the user about the CPU load of each particular track in real time. The instant invention can be implemented either as an add-on to a pre-existing multi-track multimedia editing application or as an integral part of a multi-track multimedia application. Through the use of the instant invention a user would be able to quickly and easily determine the performance bottlenecks within a multi-track audio or video arrangement and would additionally be able to eliminate the problem or at least create a workaround. Another feature of the instant invention is that it helps to educate users by pointing out problem sections of the work that might be brought about by, for example, certain combinations of user selected parameters.

The foregoing has outlined in broad terms the more important features of the invention disclosed herein, so that the detailed description that follows may be more clearly understood, and so that the contribution of the instant inventors to the art may be better appreciated. The instant invention is not limited in its application to the details of the construction and to the arrangements of the components set forth in the following description or illustrated in the drawings. Rather the invention is capable of other embodiments and of being practiced and carried out in various other ways not specifically enumerated herein. Additionally, the disclosure that follows is intended to apply to all alternatives, modifications and equivalents as may be included within the spirit and the scope of the invention as defined by the appended claims. Further, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the instant invention will become apparent upon reading the following detailed description and upon reference to the drawings in which.

DESCRIPTION OF THE PREFERRED EMBODIMENTS

Referring now to the drawings, wherein like reference numerals indicate the same parts throughout the several views, there is provided a preferred system and method for assisting a user in identifying the relative or absolute CPU usage required to play or sound specific tracks in a multi-track multimedia editing application, additionally the instant invention enables the user to identify the individual-track CPU usage values in real time during a work's performance by an editing application, a play-back only application, etc.

By way of general explanation and in accord with the preferred embodiment, it is to be understood that when the phrase "assisting a user in identifying the relative or absolute CPU usage" is used herein that usage will preferably be interpreted as either adding specific GUI (graphical user interface) elements to the GUI of an already existing multi-track multimedia application or delivering a multi-track multimedia application with fixed integration of the needed specific GUI elements onto each visual representation of the tracks of the multi-track multimedia application. Accordingly, the instant invention will preferably be implemented either in form of a plugin to pre-existing software or as integral part of a custom editing application.

For purposes of the instant embodiment it should be understood that the invention preferably seeks to allow the user to eliminate a fundamental annoyance when working with multi-track multimedia editing applications, especially when working with audio editing/creating applications. The instant invention is primarily intended to help the user to quickly locate problematic setups in the multi-track arrangement of an audio or video work. Problematic setups typically manifest themselves as stutters, noise, lags or other performance anomaly in the audio performance of a multi-track multimedia work. The implementation and use of the instant invention allows the user to first identify and then eliminate these problematic settings or arrangements. Additionally, the instant invention will operate as a teaching tool when working with the multi-track multimedia editing application, in that this invention will help a novice user recognize which parameter settings are most likely to create hardware "lag" issues.

Figure 1:
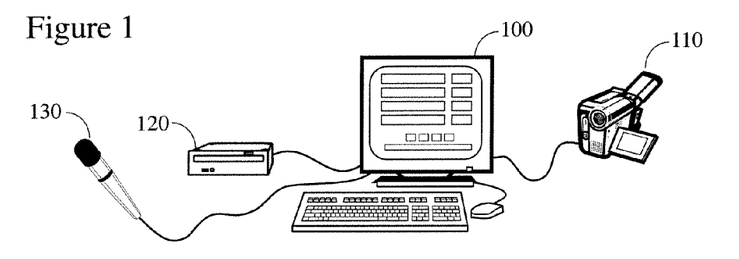
FIG. 1 illustrates a preferred general environment of the instant invention.

Turning first to the general environment of the invention and as is generally indicated in FIG. 1, at least a portion of the instant invention will be implemented in the form of software running on a users computer 100. Such a computer will typically have access to some amount of program memory and storage (whether internal or accessible via a network) as is conventionally utilized by such units.

Additionally it is possible that an external camera 110 of some sort will be utilized with—and will, preferably be connectable to—the computer so that video and/or graphic information can be transferred to and from the computer. Preferably the camera 110 will be a digital video camera, although that is not a requirement, as it is contemplated that the user might wish to utilize still images from a digital still camera in the creation of his or her multimedia work. Further given the modern trend toward incorporation of cameras into other electronic components (e.g. in handheld computers, telephones, laptops, etc.) those of ordinary skill in the art will recognize that the camera might be integrated into the computer or some other electronic device and thus, might not be a traditional single-purpose video or still camera. Although the camera will preferably be digital in nature, any sort of camera might be used, provided that the proper interfacing between it and the computer is utilized. Additionally a microphone 130 might be utilized so that the user can add voice-over narration to a multimedia work and a CD/DVD burner 120 could be useful for reading and/or storing in-progress or completed works.

Figure 2:
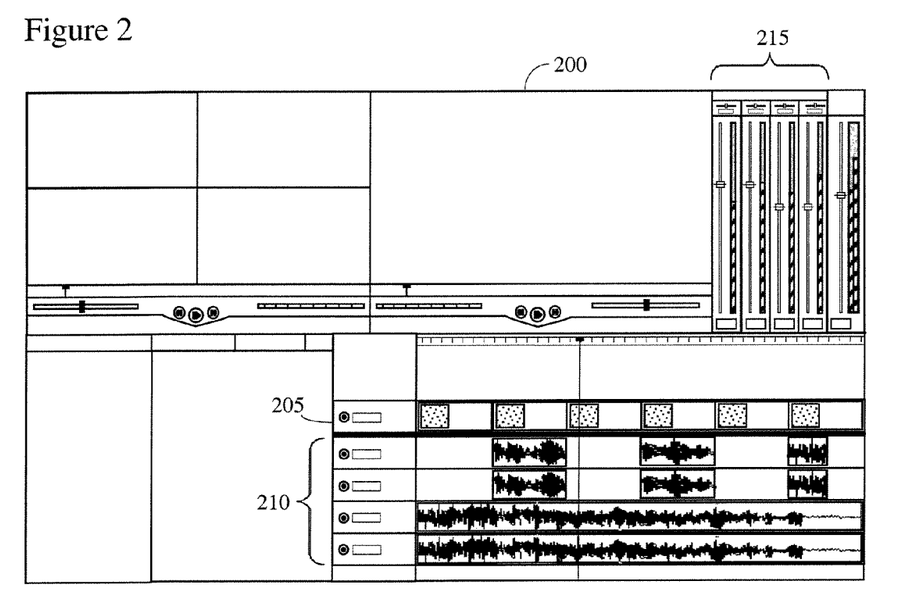
FIG. 2 illustrates a graphical user interface and an associated mixer of the sort that might be found in a prior art video editing program (prior art).

FIG. 2 contains a schematic illustration of a graphical user interface of the sort that are typically used in a prior art multi-track multimedia editing application. As is indicated in this figure, typically the user is presented with an interface 200 of the sort generally indicated. This figure shows a prior art approach as it might appear in a multi-track editing environment wherein video data 205 and audio data 210, respectively have been inserted into designated tracks by the user. The use of peak amplitude meters 215 in an audio and video editing program is, of course, old and well known. It is conventional in such programs to associate each track in a multi-track environment with a bar, graph, meter, or other indicia that represents the instantaneous sound level/volume of the associated track. Typically the height of each bar in these prior art meters corresponds to the volume of the associated track. As the work is played, the varying levels of the meters guide the user as to how best to balance the sound output of the multimedia work. However, and as has been discussed previously, this approach only covers the volume aspect of the multimedia work and does not give the user any indication about the source of specific "lags", stutter, "hiccups" or other performance anomaly that occur when working with the editing application.

Figure 3:
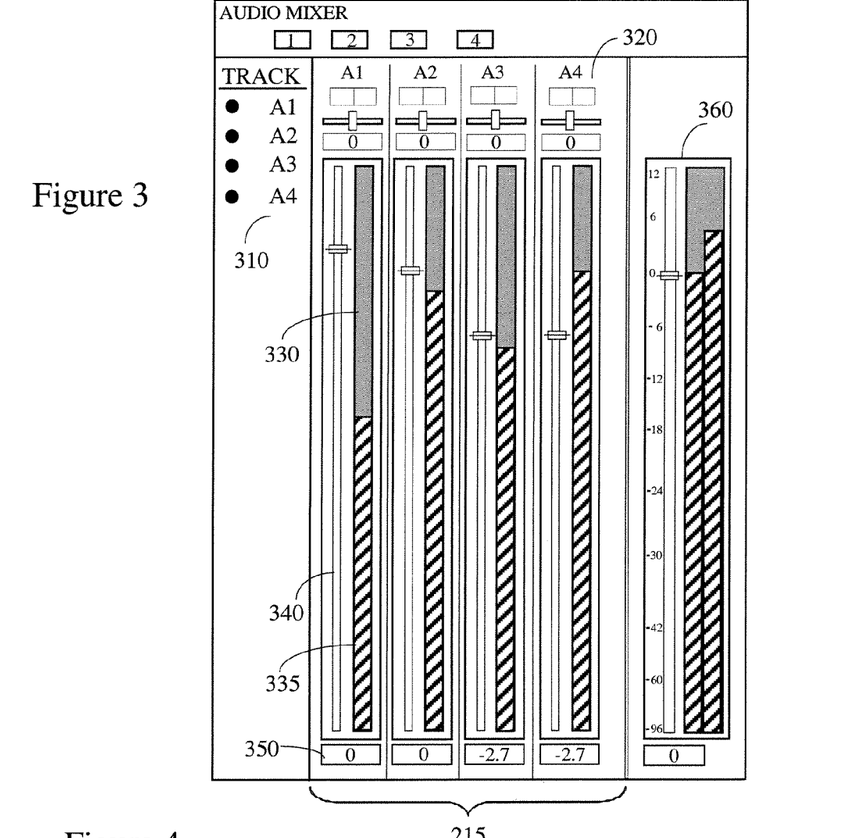
FIG. 3 contains an expanded view of the audio mixer of FIG. 2 (prior art).

Turning next to FIG. 3, this figure illustrates a zoomed version of the section containing the individual amplitude meters from FIG. 2. This sort of graphical display is generally referred to as an audio mixer 300 and is quite common in multimedia editing applications. The user is generally able to select and de-select specific tracks 310 from the multi-track arrangement, selected tracks typically being the ones that are sounded or voiced during playback. In most cases, the editing software represents the audio mixer 300 as some sort of combination of bars, meters, graphs, etc., so that for each selected track a specific bar, meter or graph combination 320 is visible and selectable by the user.

The arrangement of visual volume indicators in the prior art example of FIG. 3 consists of a meter, which indicates the current volume of that particular track 330, wherein the volume level is typically indicated using a specific coloring (or graphical pattern, etc.) within the meter 335. In addition to viewing information about the current volume level, the user is typically allowed to separately manipulate the relative or absolute volume level of each track by changing the values of a track-associated volume meter 340. If the user prefers, he or she is often given the option of manually entering a numerical value 350 into a field that has been provided for that purpose, in which case the graphical user interface and the selected value will be applied to the volume of that selected track. In addition to track-associated meters, a prior art graphical user interface typically also contains a global volume meter 360, with which the user can manipulate the global volume of the multimedia work. As was explained previously, this prior-art approach only allows the user to change and view settings and values associated with the volume of the multimedia work. This sort of approach does not help when hardware or software bottlenecks cause the editing application to become unstable and therewith ruins the experience of the created multimedia work.

Figure 4:
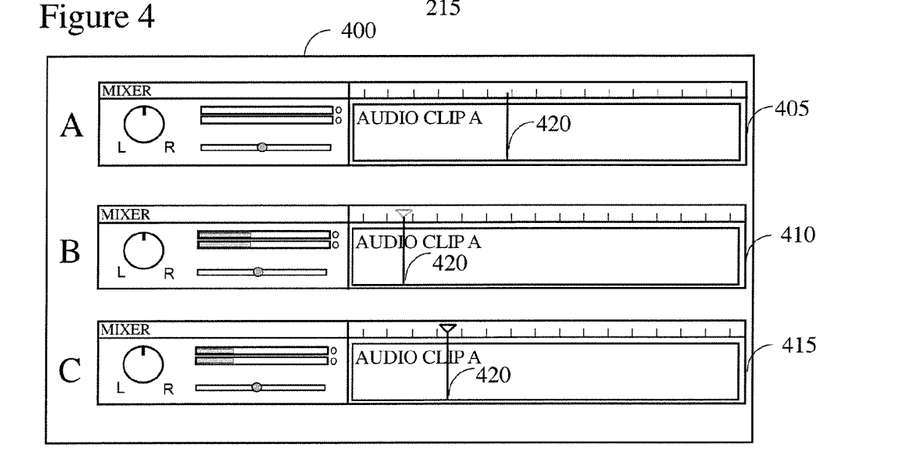
FIG. 4 illustrates a prior art approach of globally displaying the CPU demand in a multi-track multimedia editing application (prior art).

FIG. 4 illustrates an approach utilized in prior art audio editing applications that informs the user in real-time about the general CPU load. In this figure, three stages of one audio editing application are illustrated, wherein each stage shows the same track at—different moments in time (FIGS. 4A, 4B, and 4C, respectively). The graphical user interface of a prior art audio editing application typically features a pointer 420 or other indicia that illustrates the instantaneous CPU-load by means of a changing color or pattern. In FIG. 4A, the prior art approach indicates a low overall CPU load by giving the pointer 420 a very low graphical intensity. In FIG. 4B, the pointer 420 is darker and illustrates a scenario where the global CPU load is higher. Finally, FIG. 4C illustrates a case where the CPU load is almost at a maximum of 100 percent and, therefore, the pointer 420 is painted almost completely black. This sort of approach is one of the many visual variants that have been used to inform the user of overall CPU load in multimedia applications.

Figure 5:
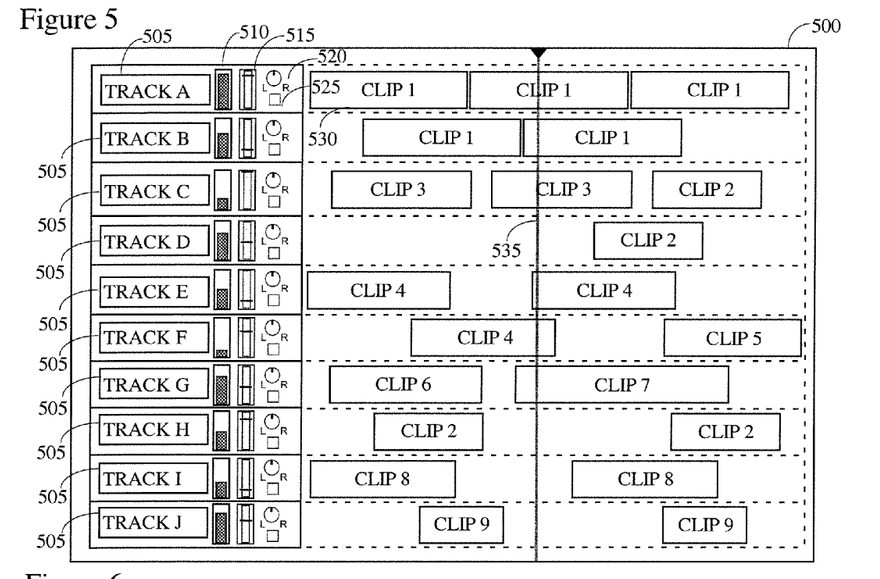
FIG. 5 contains a preferred embodiment of the instant invention, wherein each track is given a bar-type performance meter, the height of which represents the CPU load required to play the associated track.

Turning now to a discussion of the instant invention, FIG. 5 illustrates a preferred embodiment of the instant invention which has been incorporated into the user interface 500 of a multi-track multimedia editing application. The user will preferably be presented with a multiplicity of tracks 505, wherein each track typically contains audio, video, or both. The user will preferably be presented with a dynamic volume meter 510, which provides a real-time indication of the relative volume of each track. Additionally the user will be able to change the balance of the content of each track by using the appropriate user control 520. Further, the user will also preferably be able to enable/disable each track via the appropriate user control 525. Within each individual track the user will preferably be able to add audio or video clips 530 to create a multi-track multimedia arrangement. Still further, and as is typically done, preferably an on-screen bar 535 or other indicator will be used to inform the user about the current time-position of the playback. According to the instant invention, the CPU load for each track will preferably be displayed to the user by means of a graphical user interface element 515 that accompanies each track, wherein this element can be used by the user to quickly determine which tracks require the most CPU power and are therefore most likely responsible for causing playback problems.

Figure 6:
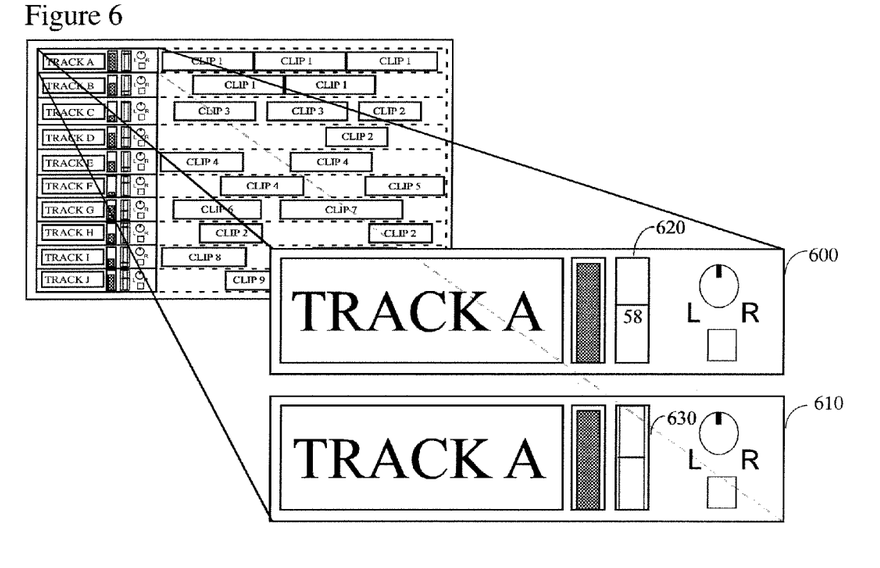
FIG. 6 contains an expanded view of the specific information section of the tracks of FIG. 5 which illustrates some preferred alternative-approaches to visualizing the CPU demand of each track.

Turning next to FIG. 6, this figure illustrates two preferred means by which the CPU load for each track might be communicated to the user. In a first preferred embodiment (FIG. 6A), the CPU load for Track A is indicated by way of a numerical value (e.g., "58" in this example) within the load indicator region 620. The numerical value (e.g., scaled between 0 and 100) could either be placed in a fixed location within the region 620, or allowed to move up and down within the indicator 620, thereby providing a secondary indication of the load (i.e., the height within the indicator 620 at which the numerical value is printed). In a second preferred embodiment (FIG. 6B), the relative height of a bar 625 within the indicator region 620 will be used to indicate the CPU load for that track, with, for example, bars 625 that are taller corresponding to greater CPU load. Obviously, Figures A and B represent just two examples of the many forms that the instant CPU load indicator could take.

Figure 7:
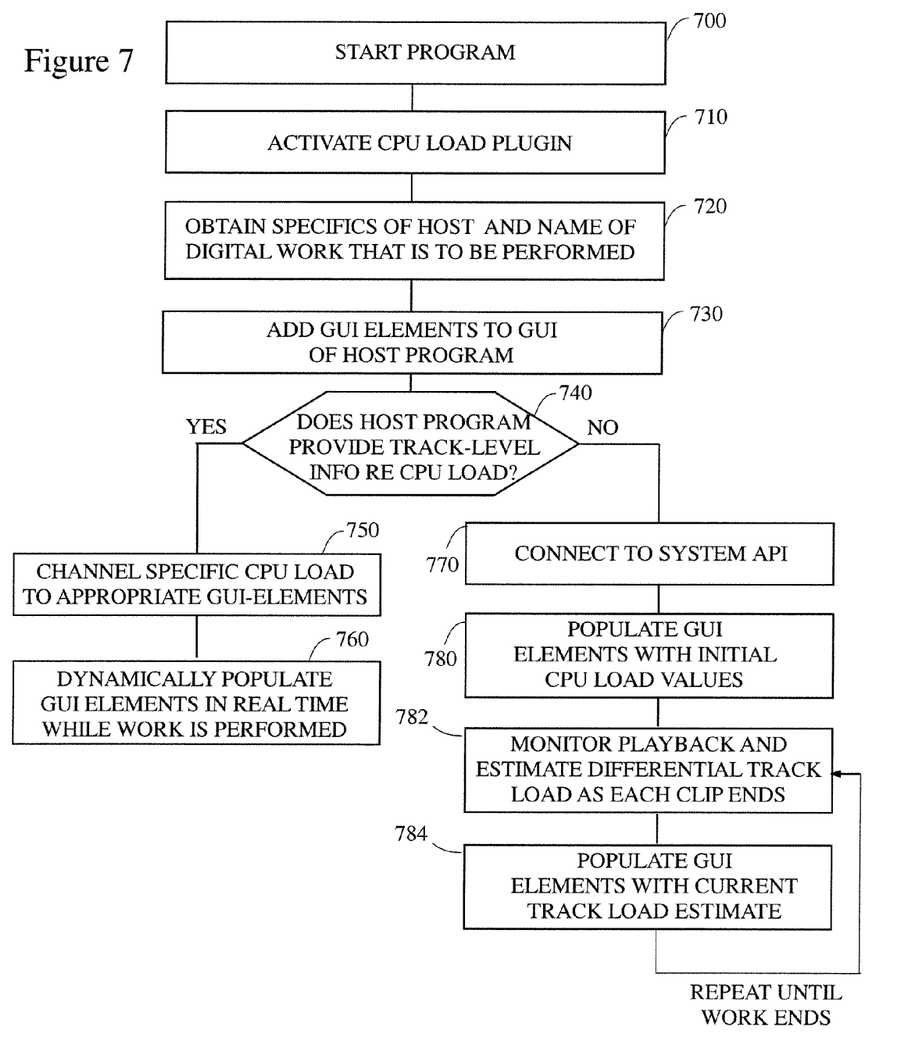
FIG. 7 contains a flowchart that illustrates the preferred operating logic of an embodiment of the instant invention.

Turning next to FIG. 7, wherein is illustrated a workflow appropriate for use with the instant invention, in one preferred embodiment a host program will be initiated (step 700). The preferred host program will either be a computer multimedia editing program in which the instant invention has been made an integral part or, as is illustrated in this figure, a plugin or other separate resource utilizable by a stand-alone program. In a next preferred step, the user will locate and load the specific CPU load display plugin (step 710). That being said, in some cases the software module that implements the instant invention might be located and loaded automatically according to methods well known to those of ordinary skill in the art. One advantage of using a plugin-type architecture is that this makes it possible for the instant invention to be utilized with a wide variety of multi-track editing and/or playback applications. This further makes it possible for the instant technology to be readily incorporated into new software products as they appear.

In the next preferred step, the plugin will preferably obtain information about the work environment (step 720), which might include, for example information about the type of the host-program, information pertaining to the operating system and/or its revision level, etc. In some preferred embodiments, this information will enable the instant invention to activate only those features that are compatible with the host-program. Additionally, some indication should be obtained from the user or elsewhere of the name and/or location of the digital work that is to be performed. This might take the form of, by way of example only, a file name (including the file path) or the location of a default digital work (e.g., the work that was last performed), etc.

As a next preferred step the instant invention will preferably add GUI elements to the graphical user interface of the host-program (step 730). Preferably, this addition will be carried out through the use of a simple graphical overlay that will be drawn over the standard graphical user interface. Alternatively, the GUI element might be added to the graphical user interface of the host-program directly, the advantage of this approach being that the functionality of the instant invention will be integrated completely into the host-program.

As a next preferred step, the instant invention will determine whether or not the host-program is capable of providing track-level CPU load information (decision item 740). By way of explanation, in a computer program written specifically to take advantage of the instant invention it is anticipated that track-by-track CPU usage information will be provided internally in a sorted format for use as needed. Alternatively, the instant invention will determine the necessary information from the performance characteristics of the CPU and its current load, such information being provided to the GUI in near real time as is discussed below.

With respect to the left branch of decision item 740, if the host-program has made available detailed track load information the plugin will preferably obtain the information from the host-program and will transmit the track load values 750 to the appropriate GUI elements. Next, and preferably, the instant invention will dynamically and continuously populate the GUI elements 760 with the track load data values.

On the other hand, and with respect to the "NO" branch of decision item 740, if the query of the host-program regarding the provision of detailed CPU load information results in a negative answer, the instant invention will connect to the API of the underlying operating system 770 and will, by way of a constant comparison between the currently played clips/active tracks and the current CPU load, determine the specific CPU load values for each individual track in real time (steps 780, 782, and 784). Of course, due to the limited availability of track-specific data values it should be understood that this variant of the instant invention delivers load estimates for the individual tracks which may not be as precise as the values for the individual tracks provided in the other previously described variants. However, these values will enable a user to at least roughly determine specific "bottleneck" tracks in the arrangement. A more detailed description of this particular approach is illustrated in combination with FIG. 9. As those track load values are determined, the instant invention will preferably continuously estimate the track load values (step 782), populate the added GUI elements with initial 780 and estimated track load data values 784 in real time, thereby informing the user of the CPU load required by each individual track during playback.

Figure 8:
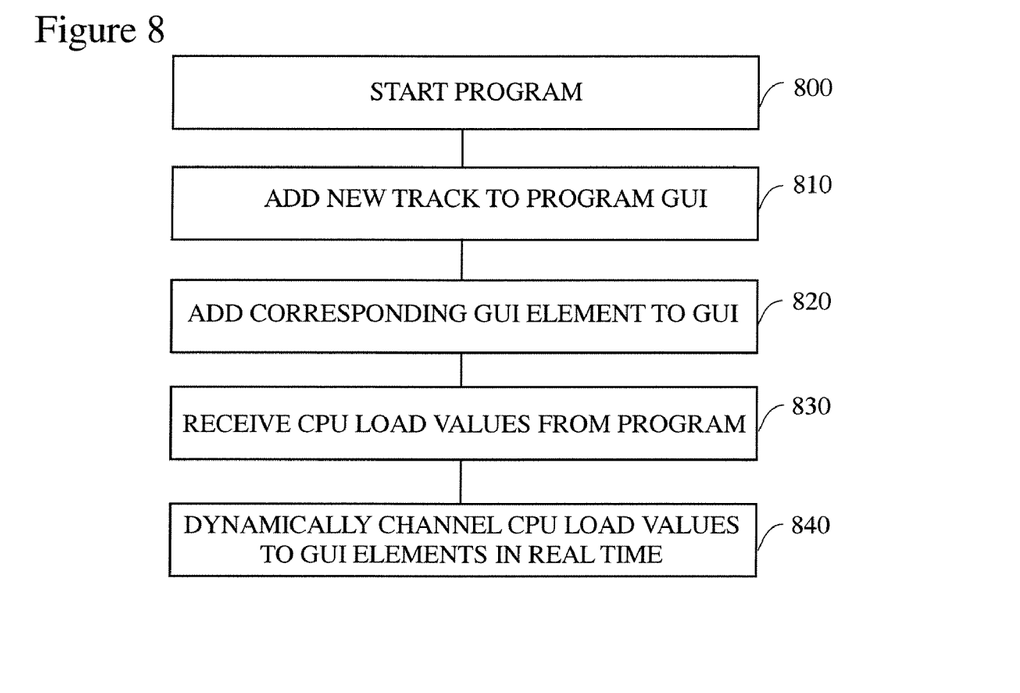
FIG. 8 depicts a flowchart illustrating the preferred workflow of the instant invention when integrated into a multi-track multimedia editing application.

Turning next to FIG. 8, this figure contains additional details of a preferred operating logic suitable for use when the instant invention has been made to be an integral part of the underlying multi-track multimedia editing application. As a first preferred step 800, the editing application will be started and initialized according to methods well known to those of ordinary skill in the art. The graphical user interface of the editing program will preferably include indicia representative of the available tracks. In the event that the user wishes to add a new instrument or sample to a current work project, a new track will preferably be added to the editing program either in response to a user command to that effect or automatically depending on the function selection (step 810). Upon sensing that a new track is to be added, the graphical user interface of the instant invention will preferably similarly add a new CPU load GUI element (step 820) to the GUI. As a next step, during performance of the work, the instant invention will preferably receive load values (step 830) that represent the current CPU load for each track. Preferably, the CPU load values will be discrete values, one per track. Additionally, in a next preferred step the instant invention preferably will dynamically populate the CPU load GUI element with the data values supplied by the underlying application in real time 840, so that the user can quickly decide where bottlenecks in the playback of multimedia data might be.

Figure 9:
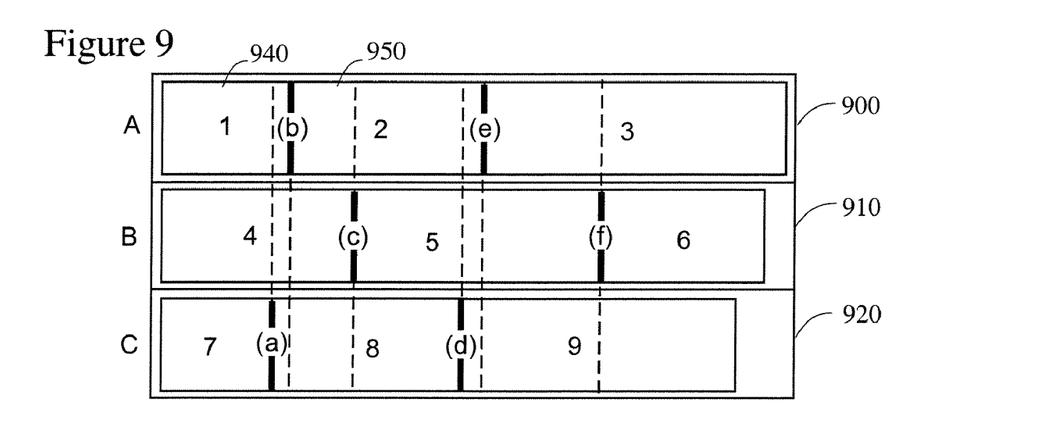
FIG. 9 illustrates a preferred approach of the instant invention in determining the individual CPU load values for individual tracks when using the system API.

Finally, and turning to FIG. 9, this figure contains a description of the processes that are preferably executed by the instant invention when being implemented as a plugin and in case that CPU load values can only be obtained from the system API of the operating system. This, of course, means that no direct measurement of the individual track loads is available and they must instead be estimated. In this approach, the instant invention will preferably take snapshots of the global (e.g., whole computer) CPU load at regular intervals, e.g., every 0.5 seconds. Note that in some cases it may be possible to determine the CPU load for the individual process (or collection of processes) that is responsible for the playback of the multimedia work. Thus, for purposes of the instant disclosure, the term "global CPU load" will be used to refer to the whole CPU load (undifferentiated with respect to process) or the load of the playback process(es) (undifferentiated with respect to individual track) as is appropriate under the circumstances.

In this figure, three tracks 900, 910 and 920 of a typical multimedia editing application are illustrated, wherein within each of these tracks are one or more multimedia clips 930 (numbered 1 to 9) which will typically be of different lengths. The endpoints of the multimedia clips are denoted by the letters (a) to (f), respectively. That is, clip 1 is bounded by the starting time of the work and a clip ending time at (b). Similarly, clip 6 is bounded by the ending time of clip 5 (time point (f)) and the end of the material contained within track B. In the scenario of FIG. 9, the ending time of one clip corresponds to the starting time of the next clip, although that may not always be the case.

To populate the added CPU load GUI elements initially, the instant invention will preferably acquire the global CPU load the moment the playback of the multimedia arrangement is initiated. Because track-level CPU performance is not available by assumption, the global CPU load value will initially be assumed to be distributed evenly between the individual tracks (e.g., the ⅓ of the global CPU load will be allocated to each track).

As the playback continues, the instant invention will attempt to estimate the CPU required to perform each track by calculating the performance differential that is observed when clips that are stored within each track are started and stopped. If one track has a significant gap between clips, that would make calculating the differential relatively straightforward. However, in the more common scenario the clips in a track will be immediately adjacent to each other, in which case another method will preferably be utilized.

According to a preferred embodiment, when playback of the first multimedia clip has ended (a), the instant invention will preferably calculate the CPU load of tracks A and B by taking a CPU load snapshot at that time. By using this snapshot the instant invention can define the CPU load value for multimedia clip 7 (difference between the global load when all three clips are playing and when one of these clips stops playing) or that particular track used for playback of multimedia clip 7. In a next preferred step it will preferably be assumed that the CPU load of multimedia clip 8 is the same or at least similar to that of multimedia clip 7 and, therefore, the CPU load value for clip 8 will also be available. Given that information, the process will preferably proceed through the multimedia clips in all tracks determining the CPU load value of the individual clips and, thus, the individual tracks.

When the playback of multimedia clip 1 is over (b), the process will next preferably determine the CPU load for multimedia clip 1 by calculating the difference between the global CPU load while all clips are playing and the global CPU load value when one of these clips stops playing. As a consequence, the CPU load value for multimedia clip 1 can be determined and, with that information and the estimate of the CPU value for multimedia clip 8, the instant invention can determine the CPU load value for multimedia clip 4 and additionally multimedia track B. Of course, the foregoing can be readily extended to an arbitrary number of tracks and clips. In general, the instant invention determines the CPU load values for each multimedia clip contained in the different tracks. Note that in some cases, the track load values may be delivered somewhat after the fact, i.e., not in "real time." In extreme cases, the best estimate of track load may only be available after the entire work has played through once. However, since the prior art does not provide any way to readily determine individual track load, even such backward oriented estimate can still be invaluable.

CONCLUSIONS

Note that, although the preferred embodiment, in case of audio editing, utilizes sampled instruments (e.g. FIG. 5), those of ordinary skill in the art will recognize that each track might contain, for example, MIDI data rather than sampled instruments or audio clips. Additionally the track load values could also be determined in some cases through the use of the API of the operating system, by, for example, a logging approach, where during the playback of the multitrack arrangement the instant invention accumulates and calculates the individual CPU load values of the multimedia clips and the corresponding tracks. Then, when the user stops the playback, the instant invention displays a statistic depicting the calculated CPU load values for each individual track so that the user can quickly determine the location of bottlenecks.

Additionally, it should be noted that, although the preferred embodiment will display the instantaneous (or, preferably, at least short-time interval) CPU load for each track during the performance of the digital work, in some embodiments the controlling program might well monitor the CPU track loads internally and indicate to the user only, for example, the largest of the CPU load either during its performance or after it has concluded. That is, in some preferred embodiments an indicator (e.g., a pointer, a change in color of the track background, a printed notation, etc.) might be used to indicate only the track that is utilizing the greatest number of CPU cycles at a given moment. The other tracks (i.e., the ones not indicated as the most CPU intensive tracks) could then be inferred to be requiring fewer CPU resources than the indicated one.

The term CPU has been used throughout to describe a device for controlling the selection, reading and/or performance (either audio, video, or a combination) of a digital work on a device that is equipped with a loud speaker (to include ear phones, head phones, etc.), and/or a display device. Obviously, the CPU might be a traditional microprocessor, but it could also be one of any number of other devices that are at least somewhat programmable (e.g., programmable logic devices ("PLD") including, without limitation, gate arrays, FPGA's (i.e., field programmable gate arrays), CPLD's (i.e., complex PLD's), EPLD's (i.e., erasable PLD's), SPLD's (i.e., simple PLD's), PAL's (programmable array logic), FPLA's (i.e., field programmable logic array), FPLS (i.e., fuse programmable logic sequencers), GAL (i.e., generic array logic), PLA (i.e., programmable logic array), FPAA (i.e., field programmable analog array), PsoC (i.e., programmable system-on-chip), SoC (i.e., system-on-chip), CsoC (i.e., configurable system-on-chip), ASIC (i.e., application specific integrated chip), etc., as those acronyms and their associated devices are known and used in the art. Further, those of ordinary skill in the art will recognize that many of these sorts of devices contain microprocessors integral thereto. Thus, for purposes of the instant disclosure the terms "processor," "microprocessor" and "CPU" (i.e., central processing unit) should be interpreted to take the broadest possible meaning herein, and such meaning is intended to include any PLD or other programmable device of the general sort described above.

Thus, the present invention is well adapted to carry out the objects and attain the end and advantages mentioned above as well as those inherent therein. While the inventive device has been described and illustrated herein by reference to certain preferred embodiments in relation to the drawings attached thereto, various changes and further modifications, apart from those shown above or suggested therein, may be made therein by those of ordinary skill in the art, without departing from the spirit of the inventive concept the scope of which is to be determined by the following claims.

What is claimed is:

1. A method of performing a multi-track work for a user, said multi-track work being comprised of at least two different tracks, comprising the steps of:
    (a) initiating a simultaneous playback for the user of at least two different tracks of said multi-track work on a playback device having at least one playback CPU, said playback device having at least one display device perceptible by the user in electronic communication therewith;
    (b) during said simultaneous playback determining at least one estimate of a load on said at least one playback CPU associated with a playback of each of said at least two different tracks, said at least one estimate of said load being determined approximately every 0.5 seconds during said playback;
    (c) during said simultaneous playback displaying to the user approximately every 0.5 seconds a representation of at least one of said at least one estimates of the load associated with a playback of each of said at least two different tracks on a display device, thereby performing said multi-track work.

2. A method according to claim 1, wherein said multi-track work exhibits at least one performance anomaly during the performance thereof, further comprising the steps of:
    (d) determining which of said at least one estimates of the load on said at least one playback CPU associated with each of said at least two different tracks is a largest playback CPU load; and,
    (e) determining that the at least one performance anomaly occurs because of a track associated with said largest playback CPU load.

3. A method according to claim 1, wherein said playback of said at least two different tracks comprises a playback of at least one video track and at least one audio track.

4. A method of performing a multi-track work for a user, said multi-track work being comprised of at least two different tracks, comprising the steps of:
    (a) initiating a simultaneous playback for the user of at least two different tracks of said multi-track work on a playback device having at least one playback CPU, said playback device having at least one display device perceptible by the user in electronic communication therewith;
    (b) during said simultaneous playback of said at least two different tracks determining at least one estimate of a load on said at least one playback CPU associated with said playback of said at least two different tracks, said at least one estimate of said load being determined more frequently than every 0.5 seconds during said playback;
    (c) during said simultaneous playback of said at least two different tracks displaying to the user more frequently than every 0.5 seconds a representation of at least one of said at least one estimates of the load associated with a playback of each of said at least two different tracks on a display device, thereby performing said multi-track work.

* * * * *